United States Patent
Hirano et al.

(10) Patent No.: US 11,695,306 B2
(45) Date of Patent: Jul. 4, 2023

(54) ROTATING ELECTRICAL MACHINE

(71) Applicant: TOYOTA JIDOSHA KABUSHIKI KAISHA, Toyota (JP)

(72) Inventors: Tatsuhiko Hirano, Toyota (JP); Kyoko Nakamura, Nagoya (JP); Mitsutoshi Akita, Nagoya (JP); Daisuke Ichigozaki, Toyota (JP); Akira Yamashita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 17/504,737

(22) Filed: Oct. 19, 2021

(65) Prior Publication Data

US 2022/0131433 A1    Apr. 28, 2022

(30) Foreign Application Priority Data

Oct. 22, 2020 (JP) ................................. 2020-177499

(51) Int. Cl.
*H02K 1/27* (2022.01)
*H02K 21/14* (2006.01)
*H02K 1/276* (2022.01)

(52) U.S. Cl.
CPC .......... *H02K 1/2766* (2013.01); *H02K 21/14* (2013.01)

(58) Field of Classification Search
CPC ...... H02K 1/2766; H02K 1/276; H02K 21/14; H02K 2213/03
USPC .................................................... 310/156.07
See application file for complete search history.

(56) References Cited

U.S. PATENT DOCUMENTS

| | | | | |
|---|---|---|---|---|
| 9,143,013 B2* | 9/2015 | Yamada | .................. | H02K 1/243 |
| 9,490,671 B2* | 11/2016 | Yamada | .................. | H02K 16/02 |
| 9,595,851 B2* | 3/2017 | Hazeyama | ........... | H02K 1/2766 |
| 9,735,631 B2* | 8/2017 | Kayano | ................ | H02K 1/2766 |
| 9,735,660 B2* | 8/2017 | Shibata | .................. | H02K 1/276 |
| 9,893,571 B2* | 2/2018 | Iwami | ...................... | H02K 1/02 |
| 2002/0180294 A1* | 12/2002 | Kaneda | .................. | H02K 1/278 |
| | | | | 310/156.43 |

(Continued)

FOREIGN PATENT DOCUMENTS

| JP | 2006-223052 A | 8/2006 |
|---|---|---|
| JP | 2021-141782 A | 9/2021 |
| JP | 2021-141787 A | 9/2021 |

*Primary Examiner* — Alex W Mok
(74) *Attorney, Agent, or Firm* — Sughrue Mion, PLLC

(57) ABSTRACT

A rotating electrical machine capable of obtaining a higher torque while minimizing the amount of permanent magnets used. A rotor core includes a plurality of first insertion holes each having an auxiliary magnet embedded therein, the auxiliary magnet being embedded so as to surround a rotation axis of a rotor in a cross-section orthogonal to the rotation axis. The rotor core includes a plurality of second insertion holes each having a main magnet embedded therein, the main magnet being embedded so as to extend from the auxiliary magnet toward an outer circumferential direction of the rotor. The rotor includes a plurality of magnetic poles formed around the rotation axis, the magnetic poles each having the auxiliary magnet and the plurality of main magnets. The auxiliary magnet is arranged disproportionately on one side of the first insertion hole in the circumferential direction of the rotor so as to form a clearance on the other side of the first insertion hole.

4 Claims, 11 Drawing Sheets

(56) References Cited

U.S. PATENT DOCUMENTS

| | | | |
|---|---|---|---|
| 2002/0180295 A1* | 12/2002 | Kaneda | H02K 1/278 310/156.43 |
| 2013/0313938 A1* | 11/2013 | Yamada | H02K 1/2746 310/156.69 |
| 2014/0035422 A1* | 2/2014 | Mikami | H02K 15/03 310/156.71 |
| 2014/0084731 A1* | 3/2014 | Iwami | H02K 1/02 310/156.07 |
| 2014/0312730 A1* | 10/2014 | Shibata | H02K 16/02 310/191 |
| 2015/0091407 A1* | 4/2015 | Kayano | H02K 1/2766 310/156.38 |
| 2015/0333579 A1* | 11/2015 | Yamada | H02K 1/243 310/156.69 |
| 2015/0357870 A1* | 12/2015 | Hazeyama | H02K 1/2766 310/156.07 |
| 2020/0228038 A1* | 7/2020 | Takahashi | H02K 1/2766 |
| 2020/0244121 A1* | 7/2020 | Takahashi | H02K 1/2766 |
| 2021/0281132 A1 | 9/2021 | Akita et al. | |
| 2021/0281153 A1 | 9/2021 | Kanada et al. | |

\* cited by examiner

ROTATING ELECTRICAL MACHINE

CROSS REFERENCE TO RELATED APPLICATIONS

The present application claims priority from Japanese patent application JP 2020-177499 filed on Oct. 22, 2020, the entire content of which is hereby incorporated by reference into this application.

BACKGROUND

Technical Field

The present disclosure relates to a rotating electrical machine, and particularly to a rotating electrical machine including a rotor in which permanent magnets are embedded in a rotor core, and a stator positioned on the outer circumference of the rotor.

Background Art

As such type of rotating electrical machine, the one including a rotor having permanent magnets embedded in a rotor core made of a soft magnetic material, and a stator positioned on the outer circumference of the rotor has conventionally been proposed. In the magnetic poles of the rotor, the permanent magnets magnetized in the circumferential direction of the rotor are embedded in the insertion holes so as to be arranged disproportionately on one side of the insertion holes (see, for example, JP 2006-223052 A).

SUMMARY

The rotating electrical machine disclosed in JP 2006-223052 A, however, uses a large amount of permanent magnets to be embedded in the rotor relative to the torque to be output by the rotating electrical machine, which likely causes a higher cost of the rotating electrical machine.

The present disclosure has been made in view of the foregoing, and provides a rotating electrical machine capable of obtaining a higher torque while limiting the amount of permanent magnets used.

In view of the foregoing, the rotating electrical machine according to the present disclosure includes a rotor with permanent magnets embedded in a rotor core made of a soft magnetic material; and a stator positioned on an outer circumference of the rotor, in which: the permanent magnets each include a main magnet arranged so as to be magnetized in a circumferential direction of the rotor, and an auxiliary magnet arranged so as to be magnetized in a radial direction of the rotor, the rotor core includes a plurality of first insertion holes each having the auxiliary magnet embedded therein, the auxiliary magnet being embedded so as to surround a rotation axis of the rotor in a cross-section orthogonal to the rotation axis, the rotor core includes a plurality of second insertion holes each having the main magnet embedded therein, the main magnet being embedded so as to extend from the auxiliary magnet toward an outer circumference of the rotor, the rotor includes a plurality of magnetic poles formed around the rotation axis, the magnetic poles each having the auxiliary magnet and at least one main magnet, and in the cross-section, the auxiliary magnet is arranged disproportionately on one side of the first insertion hole in the circumferential direction of the rotor so as to form a clearance on the other side of the first insertion hole.

According to the present disclosure, the main magnets of each magnetic pole are magnetized in the circumferential direction of the rotor, and the plurality of auxiliary magnets are magnetized in the radial direction of the rotor. When the rotating electrical machine is driven, the vector of the magnetic flux of the main magnets directed toward the stator (teeth thereof) is assisted by the magnetic flux from the auxiliary magnet to be formed so as to be inclined relative to the radial direction of the outer circumferential surface of the rotor. Since the main magnets are arranged so as to be magnetized in the circumferential direction of the rotor, the vector of the magnetic flux of the main magnets is likely to be formed so as to be inclined relative to the radial direction of the rotor. Resultantly, with such an inclined vector of the magnetic flux, a vector as a driving force of the rotor is generated along the tangential direction of the rotor from the outer circumferential surface of the rotor, so that the torque of the rotating electrical machine can be secured even with a fewer amount of magnets.

In addition, according to the present disclosure, the auxiliary magnet is arranged disproportionately on one side of the first insertion hole in the circumferential direction of the rotor so as to form a clearance on the other side of the first insertion hole. This increases a reluctance torque as compared to the one without a clearance when the same amount of magnets is used. In particular, since a clearance is formed on the other side of the first insertion hole by arranging the auxiliary magnet disproportionately on one side of the first insertion hole, the rotating electrical machine of the present disclosure can increase the vector of the magnetic flux of the main magnets that is inclined relative to the radial direction of the rotor and generate a greater driving force of the rotor as described above.

The state of being "arranged so as to be magnetized in the circumferential direction of the rotor" in the present disclosure means that the direction of magnetization of the magnet (main magnet) does not correspond to the radial direction, but is formed on the magnet so as to cross the radial direction of the rotor.

In some embodiments, in each magnetic pole, the main magnets are arranged for each of the plurality of first insertion holes formed at a distance from each other in the circumferential direction of the rotor, and in the cross-section, the main magnets of each magnetic pole are arranged such that the main magnets are arranged asymmetrically relative to a virtual line passing the rotation axis and axisymmetrically dividing an entire fan-shaped region defining each magnetic pole.

According to such an embodiment, the main magnets of each magnetic pole are arranged such that the main magnets are arranged asymmetrically. Therefore, when the rotating electrical machine is driven, the vector of the magnetic flux of the main magnets directed toward the stator is assisted by the magnetic flux from the auxiliary magnet to be formed so as to be inclined relative to the radial direction of the outer circumferential surface of the rotor. Consequently, the vector of the magnetic flux of the main magnets is likely to be formed so as to be inclined relative to the radial direction of the rotor, and a vector as a driving force of the rotor is likely to be generated along the tangential direction of the rotor from the outer circumferential surface of the rotor. In particular, as is also evident from the results of analysis conducted by the inventors, which will be described later, with the plurality of main magnets arranged on one side disproportionately relative to the virtual line and further the auxiliary magnet arranged on the same side, such an effect may be obtained more remarkably.

In some embodiments, in each magnetic pole, the main magnet is disposed at an end on one side of the auxiliary magnet in the circumferential direction. According to such an embodiment, since one of the plurality of main magnets is disposed at an end of the auxiliary magnet, the main magnet is consequently disposed at an end on one side of each magnetic pole. As a result, the magnetic flux of the auxiliary magnet can effectively be formed so as to improve the torque of the rotating electrical machine. In addition, in some embodiments, in each magnetic pole, the main magnet is further disposed at an end on the other side of the auxiliary magnet in the circumferential direction. Since this allows the magnetic flux of the auxiliary magnet to be more effectively be formed, the amount of magnets used can be reduced.

According to the present disclosure, a higher torque can be obtained while limiting the amount of permanent magnets used.

DETAILED DESCRIPTION

An embodiment of a rotating electrical machine according to the present disclosure will be detailed below on the basis of the drawings.

Figure 1:
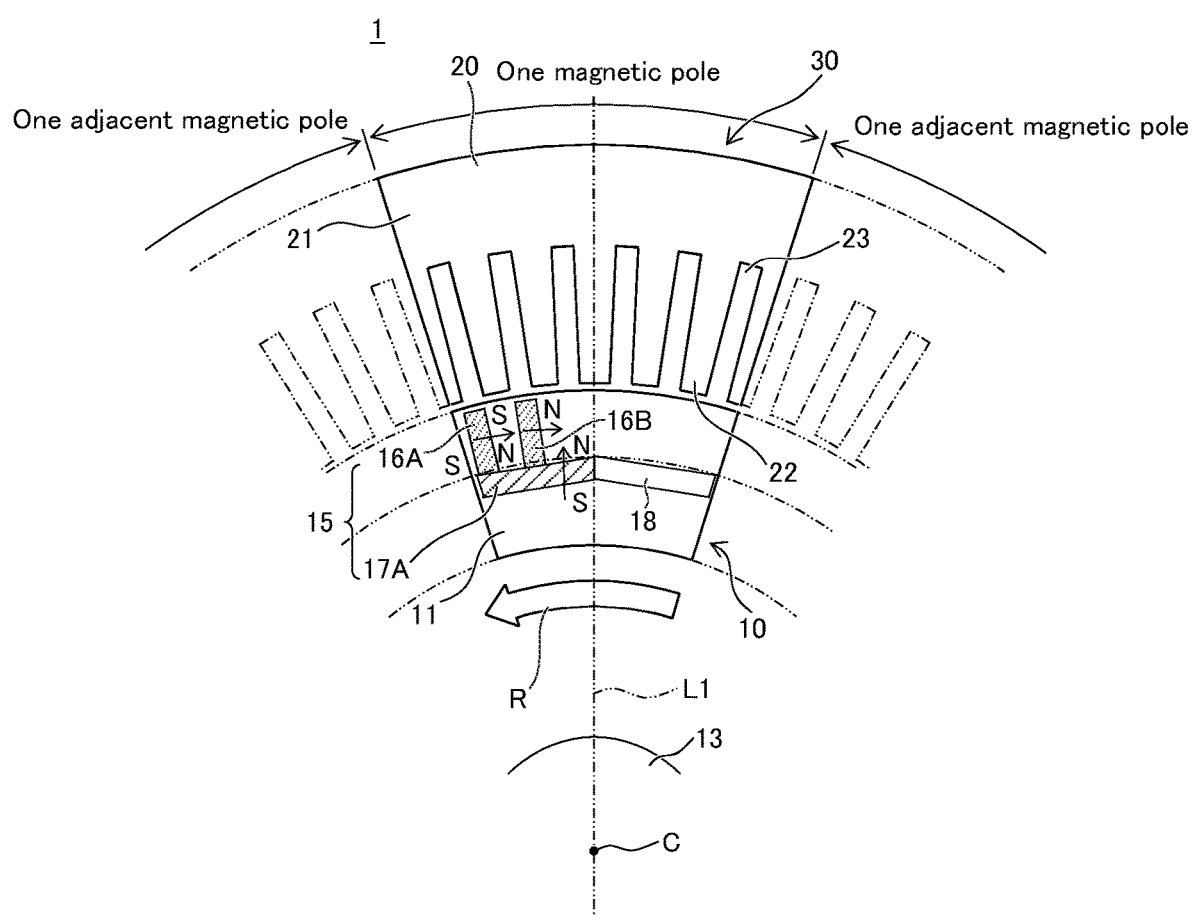
FIG. 1 is a schematic cross-sectional view of a main part of a rotor and a stator showing an embodiment of a rotating electrical machine according to the present disclosure, as is cut in a direction orthogonal to the rotation axis of the rotating electrical machine.
Figure 2:
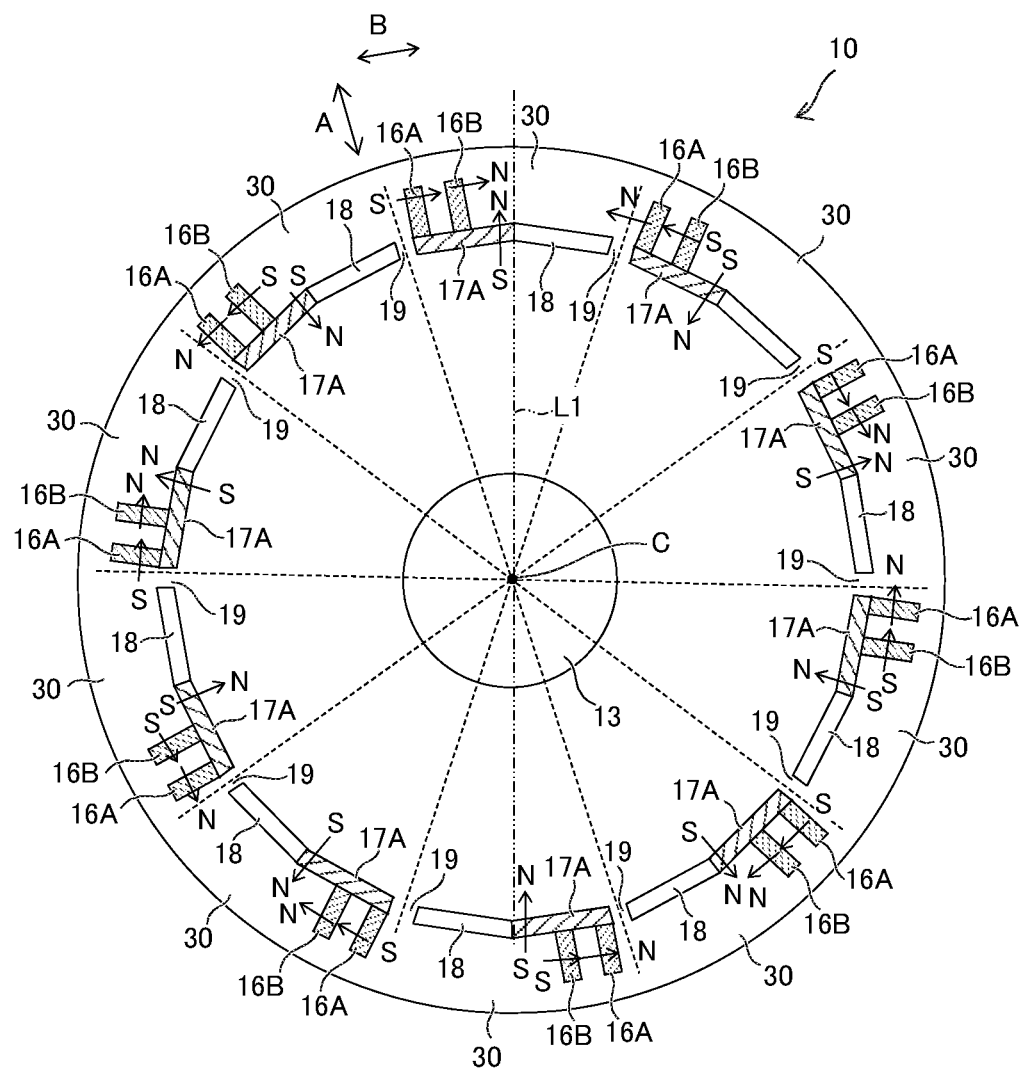
FIG. 2 is a schematic cross-sectional view showing the overall structure of the rotor illustrated in FIG. 1.

As illustrated in FIG. 1 and FIG. 2, a rotating electrical machine 1 according to the present embodiment is an IPM (Interior Permanent Magnet) motor including a rotor 10 with permanent magnets 15 embedded in a rotor core 11, and a stator 20 positioned on the outer circumference of the rotor 10. The rotating electrical machine 1 includes the cylindrical rotor 10 and the stator 20. The rotor 10 is disposed on the inner circumferential side of the stator 20 and faces the stator 20 with a distance in the radial direction, and is adapted to rotate relative to the stator 20.

The rotor 10 is adapted to rotate about a rotation axis C, and a rotary shaft 13 having the rotation axis C as the shaft center is fitted into the rotor core 11. The rotor 10 has a plurality of magnetic poles 30 formed around the rotation axis C, with the permanent magnets 15 arranged, which will be described later. An even number of magnetic poles 30 are provided, and in the present embodiment, the rotor 10 has ten fan-shaped magnetic poles 30. In this case, the fan-shaped magnetic poles 30 each have a central angle of 36°. Further, as illustrated in FIG. 2, the permanent magnets 15 of the adjacent magnetic poles 30 on the opposite sides of each magnetic pole are magnetized in the opposite directions, and in the present embodiment, the permanent magnets 15 of the adjacent magnetic poles 30 are arranged in the same positions.

The rotor core 11 is made of a soft magnetic material, examples of which include those with electromagnetic steel sheets laminated and those obtained by press-forming and then sintering soft magnetic powder. It should be noted that the electromagnetic steel sheets may be joined together with an insulating resin. Examples of the soft magnetic material forming the rotor core 11 include, but not limited to, those having at least one type of magnetic metal selected from a group consisting of Fe, Co, and Ni and at least one type of non-magnetic metal selected from a group consisting of B, C, P, Al, Si, Ti, V, Cr, Mn, Cu, Y, Zr, Nb, Mo, Hf, Ta, and W.

Examples as a representative material of the soft magnetic material include, but not limited to, a FeCo alloy (such as FeCo and FeCoV), FeNi alloy (such as FeNi, FeNiMo, FeNiCr, and FeNiSi), FeAl alloy or FeSi alloy (such as FeAl, FeAlSi, FeAlSiCr, FeAlSiTiRu, and FeAlO), FeTa alloy (such as FeTa, FeTaC, and FeTaN), and FeZr alloy (such as FeZrN).

Examples of the permanent magnet 15 include rare-earth magnets, such as a neodymium magnet containing neodymium, iron, and boron as the main components, and a samarium cobalt magnet containing samarium and cobalt as the main components. The permanent magnet 15 may be other magnets, such as a ferrite magnet and alnico magnet.

The permanent magnet 15 arranged in one magnetic pole 30 includes two main magnets 16A and 16B and one auxiliary magnet 17A. In the adjacent magnetic poles 30 on the opposite sides of the one magnetic pole 30, the main magnets 16A, 16B and the auxiliary magnet 17A are arranged in the same positions. The magnetic poles of the main magnets 16A, 16B and the magnetic poles of the auxiliary magnets 17A in the magnetization direction in the adjacent magnetic poles 30 on the opposite sides of the one magnetic pole 30 are inverted from those of the main magnets 16A and 16B and those of the auxiliary magnets 17A of the one magnetic pole 30.

Figure 4:
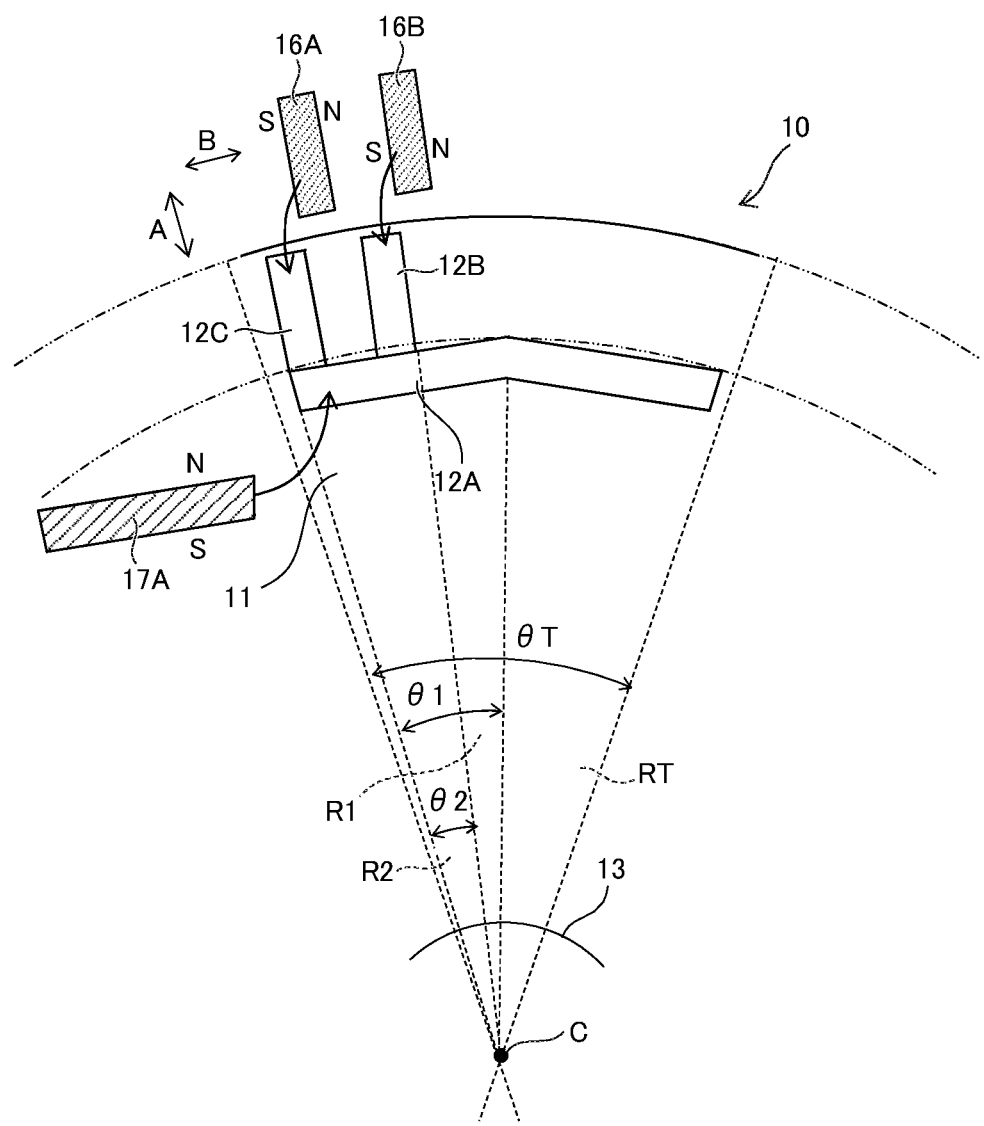
FIG. 4 is an enlarged view illustrating in detail the main magnets and auxiliary magnet in one magnetic pole of the rotating electrical machine illustrated in FIG. 1.

As illustrated in FIG. 4, in the present embodiment, the rotor core 11 has formed therein a first insertion hole 12A, into which the auxiliary magnet 17A is inserted, so as to surround the rotation axis C. Further, the rotor core 11 has formed therein, with a distance in the circumferential direction, a plurality of second insertion holes 12B and 12C, into which the main magnets 16A and 16B are inserted. The plurality of second insertion holes 12B and 12C are formed continuously on the outer circumferential side of the first insertion hole 12A and radially from the first insertion hole 12A. In the present embodiment, the first insertion holes 12A formed in the magnetic poles 30 have the same size, and the second insertion holes 12B and 12C formed in the magnetic poles 30 have the same size. The positions of the first insertion holes 12A and the second insertion holes 12B and 12C are the same in all of the magnetic poles 30.

It should be noted that in the present embodiment, the first insertion hole 12A and the second insertion holes 12B and 12C adjacent to the first insertion hole 12A form one hole. However, bridges (partitions) may be formed in a portion of the rotor core 11 to separate the first insertion hole 12A from its adjacent first insertion holes 12A and 12A, for example. These bridges (partitions) are made of the soft magnetic material forming the rotor core 11 and integrally formed with the rotor core 11. On the opposite sides of the first insertion hole 12A, bridges 19 are formed by the first insertion holes 12A in the adjacent magnetic poles.

In the present embodiment, in the cross-section orthogonal to the rotation axis C, the second insertion holes 12B and 12C, into which the main magnets 16A and 16B are inserted, are formed asymmetrically relative to a virtual line L1 passing the rotation axis C and axisymmetrically dividing the first insertion hole 12A. More specifically, given that a rotating direction R of the rotor 10 is the counterclockwise direction, the second insertion holes 12B and 12C, into which the main magnets 16A and 16B are inserted, are formed on one side disproportionately relative to the virtual line L1.

Figure 3:
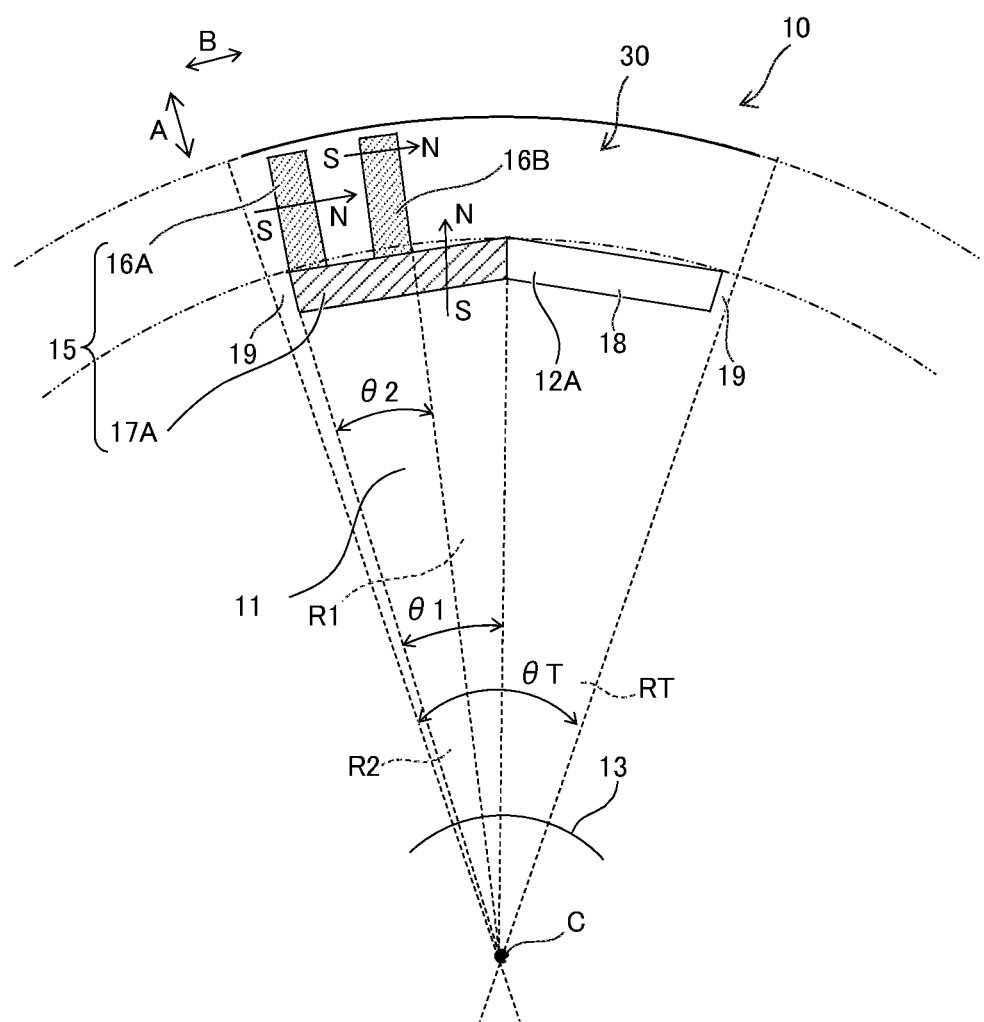
FIG. 3 is a schematic cross-sectional view for explaining an arrangement region for a plurality of main magnets illustrated in FIG. 1.

In the present embodiment, the auxiliary magnet 17A is inserted into the first insertion hole 12A. Specifically, as illustrated in FIG. 3, in the cross-section orthogonal to the rotation axis C of the rotor 10, the auxiliary magnet 17A is arranged disproportionately on one side of the first insertion hole 12A so as to form a clearance 18 on the other side of the first insertion hole 12A in the circumferential direction of the rotor 10.

The main magnets 16A and 16B are inserted into the second insertion holes 12B and 12C. In each magnetic pole 30, the main magnets 16A and 16B are arranged such that the permanent magnet 15 is arranged asymmetrically relative to the virtual line L1 axisymmetrically dividing one auxiliary magnet 17A of the rotor 10. In the present embodiment, the virtual line L1 corresponds to a line bisecting the central angle of the fan-shaped magnetic pole 30. Herein, each magnetic pole 30 includes one first insertion hole 12A, and the magnetic poles 30 are formed by being divided at an equal angle about the rotation axis C to each include one first insertion hole 12A.

As illustrated in FIG. 1, in one magnetic pole 30, the main magnets 16A and 16B of each magnetic pole 30 are arranged such that the plurality of (two) main magnets 16A and 16B are asymmetrically arranged relative to the virtual line L1. More specifically, in one magnetic pole 30, the permanent magnet 15 including the main magnets 16A and 16B and the auxiliary magnet 17A is arranged asymmetrically relative to the virtual line L1. It should be noted that in the present embodiment, one magnetic pole 30 includes two main magnets, but one magnetic pole 30 may include one main magnet or three or more main magnets.

In the present embodiment, the main magnets 16A and 16B are arranged at a distance from each other in the circumferential direction. In the present embodiment, in each magnetic pole 30, the main magnets 16A and 16B are arranged (disproportionately) on one side of the auxiliary magnet 17A. In the present embodiment, in each magnetic pole 30, one main magnet 16A of the plurality of main magnets 16A and 16B is disposed at an end of the auxiliary magnet 17A.

The two main magnets 16A and 16B are arranged so as to be magnetized in a circumferential direction B of the rotor 10. Specifically, as illustrated in FIG. 1 and FIG. 3, the main magnets 16A and 16B are magnetized in the circumferential direction B, and the direction of magnetization of the two main magnets 16A and 16B is the clockwise direction about the rotation axis C. It should be noted that in the present specification, the "direction of magnetization" means the direction of the magnetic flux that flows out of the north pole, and corresponds to the direction connecting the south pole and the north pole of one magnet.

Herein, the entire region RT is a fan-shaped region segmenting the magnetic poles 30 in the cross-section of the rotor 10. In the present embodiment, the entire region RT is a region surrounded by two straight lines connecting the rotation axis C and the portions between the adjacent first insertion holes 12A (specifically, the centers of the bridges 19) and the arc as a portion of the outer circumference of the rotor 10. Specifically, as illustrated in FIG. 3, the entire region RT is a region defined by a central angle θT about the rotation axis C, and the central angle θT of the entire region RT is a value obtained by dividing 360° by the number of magnetic poles.

In each magnetic pole 30, a first arrangement region R1 illustrated in FIG. 3 is a fan-shaped region defined by a minimum central angle θ1, including a portion of the outer circumference of the rotor 10 as an arc, and allowing the auxiliary magnet 17A to be arranged about the rotation axis C. In each magnetic pole, a second arrangement region R2 is a fan-shaped region defined by a minimum central angle θ2, including a portion of the outer circumference of the rotor as an arc, and allowing the plurality of main magnets 16A and 16B of each magnetic pole 30 to be arranged about the rotation axis C.

Figure 6:
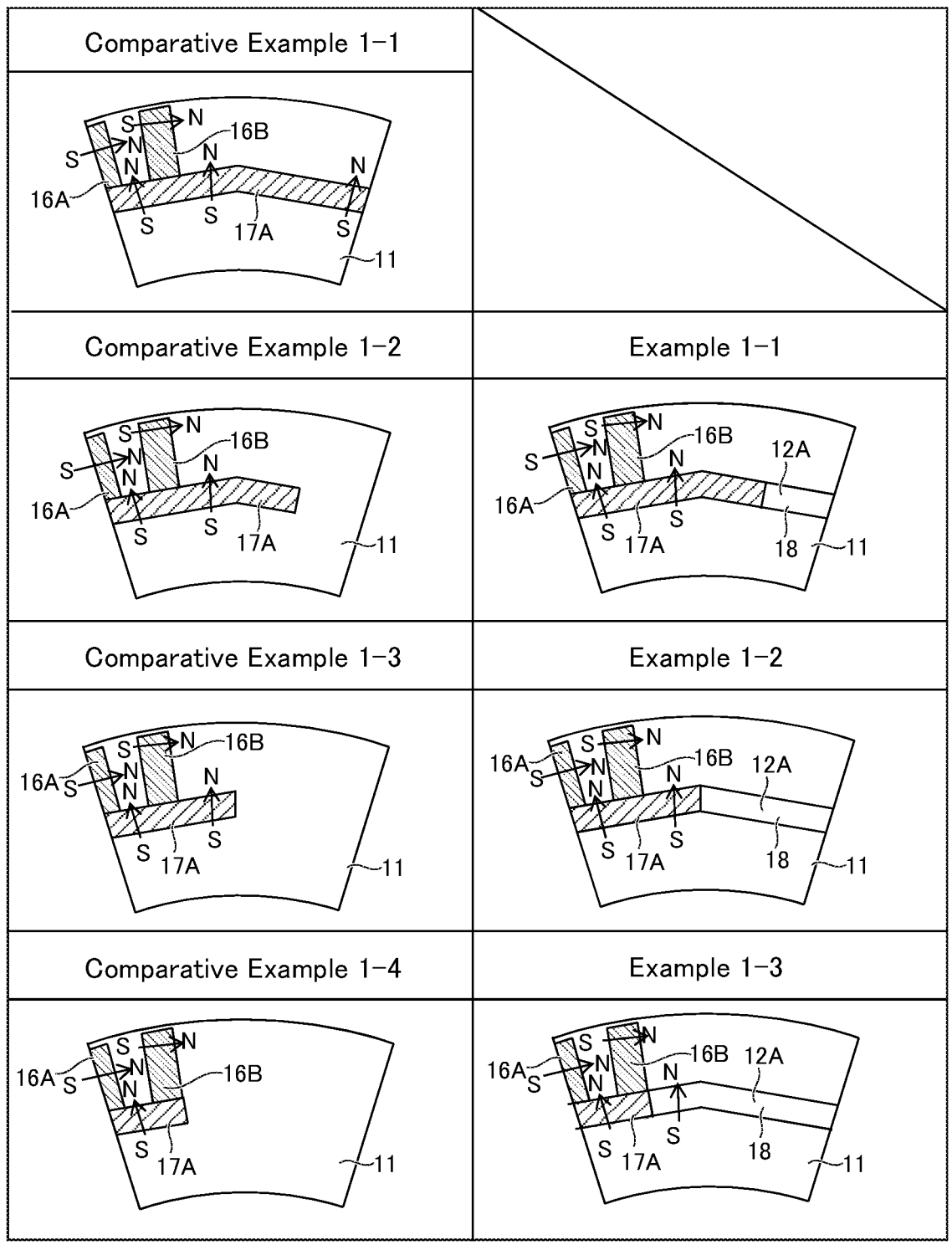
FIG. 6 is a table of views each showing an analysis model of a magnetic pole of a rotor in Examples 1-1 to 1-3 and Comparative Examples 1-1 to 1-4.

In the present embodiment, the entire region RT includes the first arrangement region R1 and the second arrangement region R2, and in FIG. 3, the central angle θ1 of the first arrangement region R1 is greater than the central angle θ2 of the second arrangement region R2. However, as illustrated in FIG. 6, as can be clearly seen from the results of Example 1-3 and Examples 2-1 to 2-4, which will be described later, the central angle θ1 of the first arrangement region R1 may be equal to the central angle θ2 of the second arrangement region R2 (Example 1-3), or the central angle θ1 of the first arrangement region R1 may be smaller than the central angle θ2 of the second arrangement region R2 (Examples 2-1 to 2-4). This allows obtaining a higher torque while limiting the amount of the auxiliary magnets 17A used.

In the magnetic poles 30 adjacent on the opposite sides of the magnetic pole 30 illustrated in FIG. 1, the main magnets 16A and 16B are arranged so as to be magnetized in the circumferential direction B of the rotor 10 (see FIG. 2). However, the direction of magnetization of the main magnets 16A and 16B of the adjacent magnetic poles 30 is the counterclockwise direction about the rotation axis C, which is different from the magnetic pole 30 illustrated in FIG. 1.

Specifically, the north pole and south pole of the main magnets 16A and 16B of the adjacent magnetic poles 30 are inverted from those of the main magnets 16A and 16B of the magnetic pole 30 illustrated in FIG. 1. In this manner, in the present embodiment, the main magnets 16A and 16B of the magnetic poles 30 are arranged such that the main magnets 16A and 16B of the adjacent magnetic poles 30 are magnetized alternately in the opposite directions.

Further, the magnetic pole 30 illustrated in FIG. 1 is provided with one auxiliary magnet 17A. The auxiliary magnet 17A is arranged so as to be magnetized outward in a radial direction A. Specifically, the auxiliary magnet 17A illustrated in FIG. 1 is arranged such that the south pole is on the inner circumferential side and the north pole is on the outer circumferential side.

In the present embodiment, since the rotor 10 has ten magnetic poles, as illustrated in FIG. 2, the rotor core 11 is provided with ten auxiliary magnets 17A. These auxiliary magnets 17A are arranged so as to surround the rotation axis C. The magnetic poles 30 each have the auxiliary magnet 17A and the main magnets 16A and 16B contacting the auxiliary magnet 17A.

In the magnetic poles 30 adjacent on the opposite sides of the magnetic pole 30 illustrated in FIG. 1, the auxiliary magnets 17A are arranged so as to be magnetized in the radial direction A of the rotor 10 (see FIG. 2). However, the auxiliary magnets 17A of the adjacent magnetic poles 30 are magnetized such that the north pole is on the inner circumferential side and the south pole is on the outer circumferential side, and the auxiliary magnets 17A of the adjacent magnetic poles 30 are magnetized inward in the radial direction A, which are different from those in FIG. 1. That is, the north pole and south pole of the auxiliary magnets 17A of the adjacent magnetic poles 30 are inverted from those of the auxiliary magnet 17A of the magnetic pole 30 illustrated in FIG. 1. In this manner, in the present embodiment, the auxiliary magnets 17A of the magnetic poles 30 are arranged such that the auxiliary magnets 17A of the adjacent magnetic poles 30 are magnetized alternately in the opposite directions.

The stator 20 has a tubular stator core 21, from which a plurality of teeth 22 extend toward the rotation axis C in the inner circumferential direction. Therefore, spaces between the plurality of teeth 22 form slots 23, into which coils (not shown) for magnetizing the stator 20 are to be inserted.

The stator 20 is made of a soft magnetic material as with the rotor 10. The stator 20 is configured such that the plurality of teeth 22 face one magnetic pole of the rotor 10. The teeth 22 are wound with a coil (not shown), and magnetized when the coil is energized. In the present embodiment, the way of winding the coil is not particularly limited, but the present embodiment employs the distributed winding to wind the coil.

The effects of the rotating electrical machine 1 of the present embodiment configured as described above will be described below. When the coil wound around the teeth 22 of the stator 20 is energized, the teeth 22 of the stator 20 are magnetized, and with the magnetic attraction between the main magnets 16A and 16B and the auxiliary magnet 17A of the rotor 10, the torque to rotate the rotor 10 in a counterclockwise direction R is generated.

Figure 5:
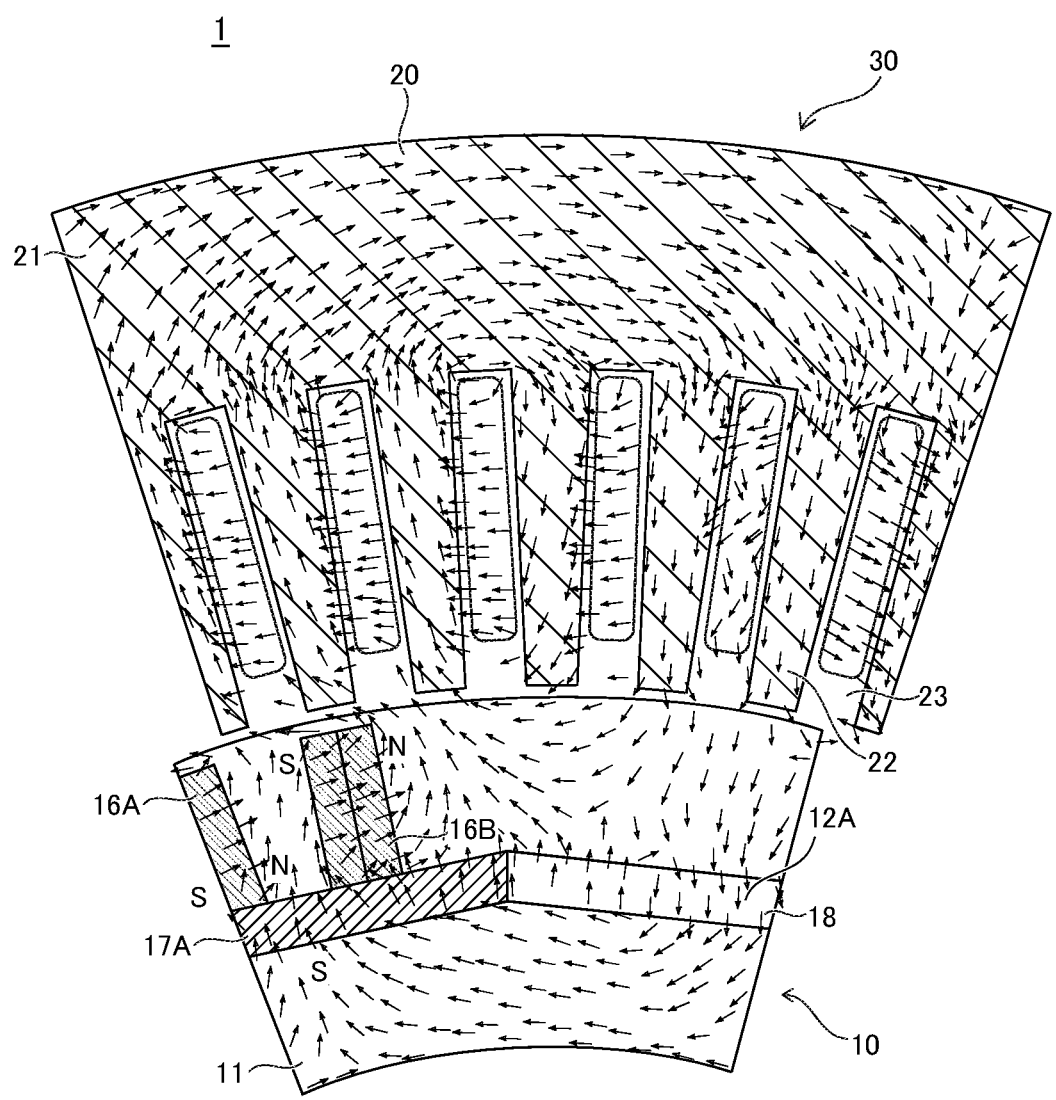
FIG. 5 is a schematic view showing a vector of a magnetic flux generated when a coil is energized between the rotor and the stator illustrated in FIG. 1.

In the rotating electrical machine 1 according to the present embodiment, the main magnets 16A and 16B of each magnetic pole 30 are magnetized in the circumferential direction B of the rotor 10 and the auxiliary magnet 17A is magnetized in the radial direction of the rotor 10. When the rotating electrical machine 1 is driven, as illustrated in FIG. 5, the vector of the magnetic flux of the main magnets 16A and 16B directed toward the stator 20 (teeth 22 thereof) is assisted by the magnetic flux from the auxiliary magnet 17A to be formed so as to be inclined relative to the radial direction A of the outer circumferential surface of the rotor 10. Since the main magnets 16A and 16B are arranged so as to be magnetized in the circumferential direction of the rotor, the vector of the magnetic flux of the main magnets 16A and 16B is likely to be formed so as to be inclined relative to the radial direction A of the rotor 10.

Further, since the auxiliary magnet 17A is arranged disproportionately on one side of the first insertion hole 12A so as to form a clearance 18 on the other side of the first insertion hole 12A, the rotating electrical machine 1 can obtain a higher reluctance torque as compared to the one without a clearance when the same amount of magnets is used. In particular, since a clearance is formed on the other side of the first insertion hole 12A by arranging the auxiliary magnet 17A disproportionately on one side of the first insertion hole 12A, the rotating electrical machine 1 can increase the vector of the magnetic flux of the main magnets that is inclined relative to the radial direction of the rotor 10 and generate a greater driving force of the rotor 10 as described above.

Consequently, a vector as a driving force of the rotor 10 is generated on the surface of the rotor 10. This vector increases the torque to drive the rotor 10, so that the rotating electrical machine 1 can obtain a large driving torque even with a fewer amount of permanent magnets 15 used.

Furthermore, in the present embodiment, as illustrated in FIG. 3, each magnetic pole 30 includes the plurality of main magnets 16A and 16B. With such arrangement, the magnetic flux of the main magnets 16A and 16B is formed also in the soft magnetic material between the plurality of main magnets 16A and 16B, and the vector of the magnetic flux of the main magnets 16A and 16B is likely to be formed so as to be inclined relative to the radial direction A of the rotor 10. Resultantly, with such an inclined vector of the magnetic flux, the torque of the rotating electrical machine 1 can be increased.

In the present embodiment, as illustrated in FIG. 3, the main magnets 16A and 16B of each magnetic pole 30 are arranged such that the main magnets 16A and 16B are arranged asymmetrically. Therefore, when the rotating electrical machine 1 is driven, the vector of the magnetic flux of the main magnets 16A and 16B directed toward the stator 20 is assisted by the magnetic flux from the auxiliary magnet 17A to be formed so as to be inclined relative to the radial direction A of the outer circumferential surface of the rotor 10. Consequently, the vector of the magnetic flux of the main magnet 16A is likely to be formed so as to be inclined relative to the radial direction A of the rotor 10, and a vector as a driving force of the rotor 10 is likely to be generated along the tangential direction of the rotor from the outer circumferential surface of the rotor 10. In particular, as is also evident from the results of analysis in Examples 2-1 to 2-4 conducted by the inventors, which will be described later, with the plurality of main magnets 16A and 16B arranged on one side disproportionately relative to the virtual line L1 and further the auxiliary magnet 17A arranged on the same side, such an effect may be obtained more remarkably.

Further, one main magnet 16A of the plurality of main magnets 16A and 16B is disposed at an end on one side of the auxiliary magnet 17A in the circumferential direction. As a result, the magnetic flux of the auxiliary magnet 17A can effectively be formed so as to improve the torque of the rotating electrical machine 1. In addition, as shown in Examples 1-3, 2-1 to 2-4, for example, in each magnetic pole 30, the main magnet 16A is further disposed at an end on the other side of the auxiliary magnet 17A in the circumferential direction. Since this allows the magnetic flux of the auxiliary magnet 17A to be more effectively be formed, the amount of magnets used can further be reduced.

EXAMPLES

The present disclosure will be described below on the basis of the examples.

Example 1-1 to Example 1-3

As illustrated in the table of views of FIG. 6, models of a rotor, which includes two main magnets 16A and 16B in one magnetic pole, were prepared. As one of the examples of these models, the thickness of the main magnet 16B is greater than that of the main magnet 16A. In the following models of the rotor, the bridges 19 illustrated in FIG. 1 are omitted. The length (size) of the auxiliary magnet 17A decreases in the order of: Example 1-1, Example 1-2, and Example 1-3 (long to short). The auxiliary magnet 17A is arranged disproportionately on one side of the first insertion hole 12A so as to form a clearance 18 on the other side of the first insertion hole 12A. The central angle of the first arrangement region according to the auxiliary magnet 17A in Example 1-1 to Example 1-3 is respectively about ¾, ½ (half), and ¼ (quarter) of the central angle of the entire region, and the remaining space of the first insertion hole 12A forms the clearance 18 while the auxiliary magnet 17A is disposed. It should be noted that Example 1-2 corresponds to the rotor illustrated in FIG. 1.

Comparative Example 1-1 to Comparative Example 1-4

Models of a rotor according to Comparative Example 1-1 to Comparative Example 1-4 were prepared in the same manner as in Example 1-1. As illustrated in FIG. 6, Comparative Example 1-1 to Comparative Example 1-4 differ from Example 1-1 in that the central angle of the first arrangement region according to the auxiliary magnet 17A in Comparative Example 1-1 to Comparative Example 1-4 is respectively equal to, about ¾, ½ (half), and ¼ (quarter) of the central angle of the entire region, and no clearance 18 is provided. That is, in these models, the soft magnetic material equal to that of the rotor core is arranged in the clearance 18.

Figure 7:
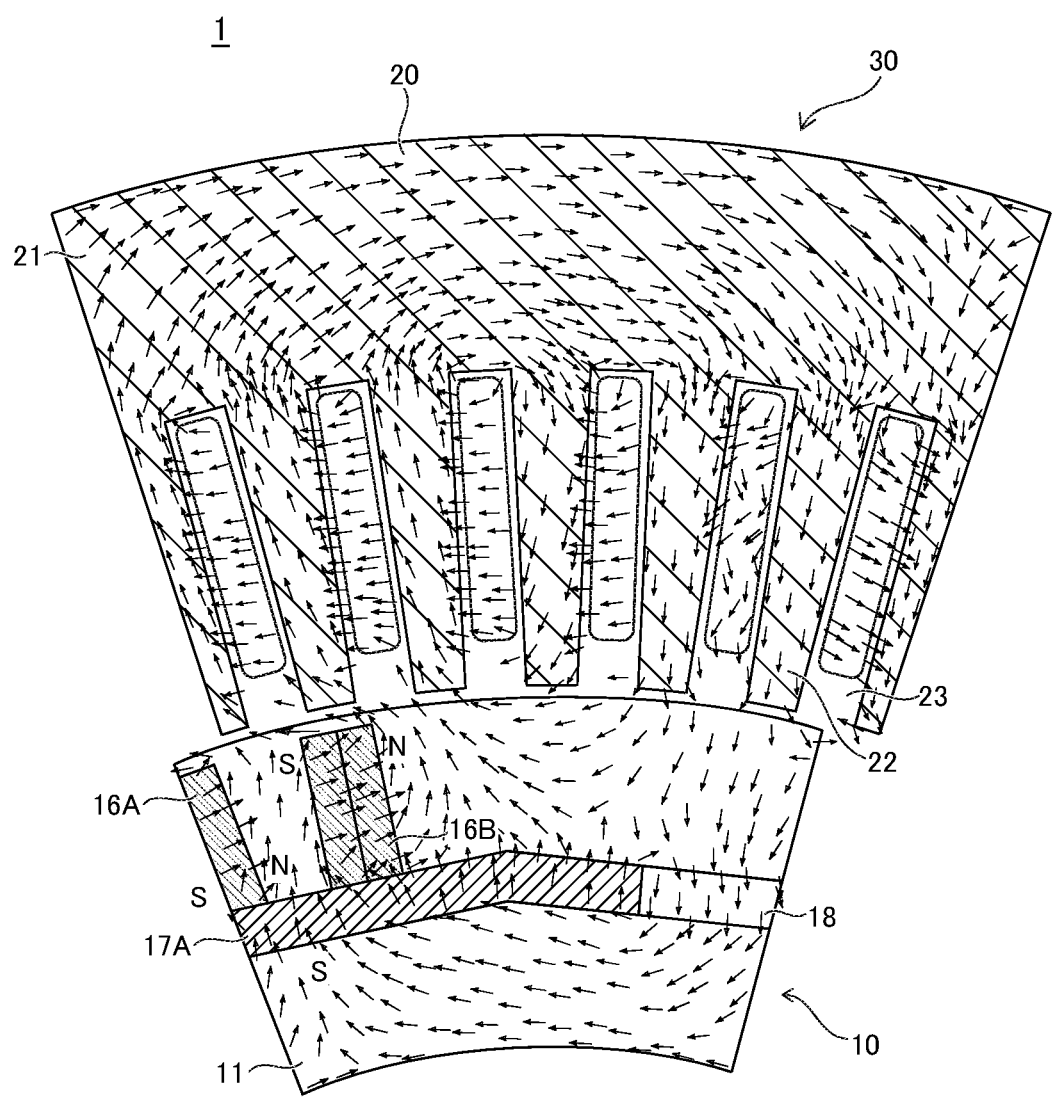
FIG. 7 is a schematic view showing a vector of a magnetic flux generated when a coil is energized between the rotor and the stator in Example 1-1.
Figure 8:
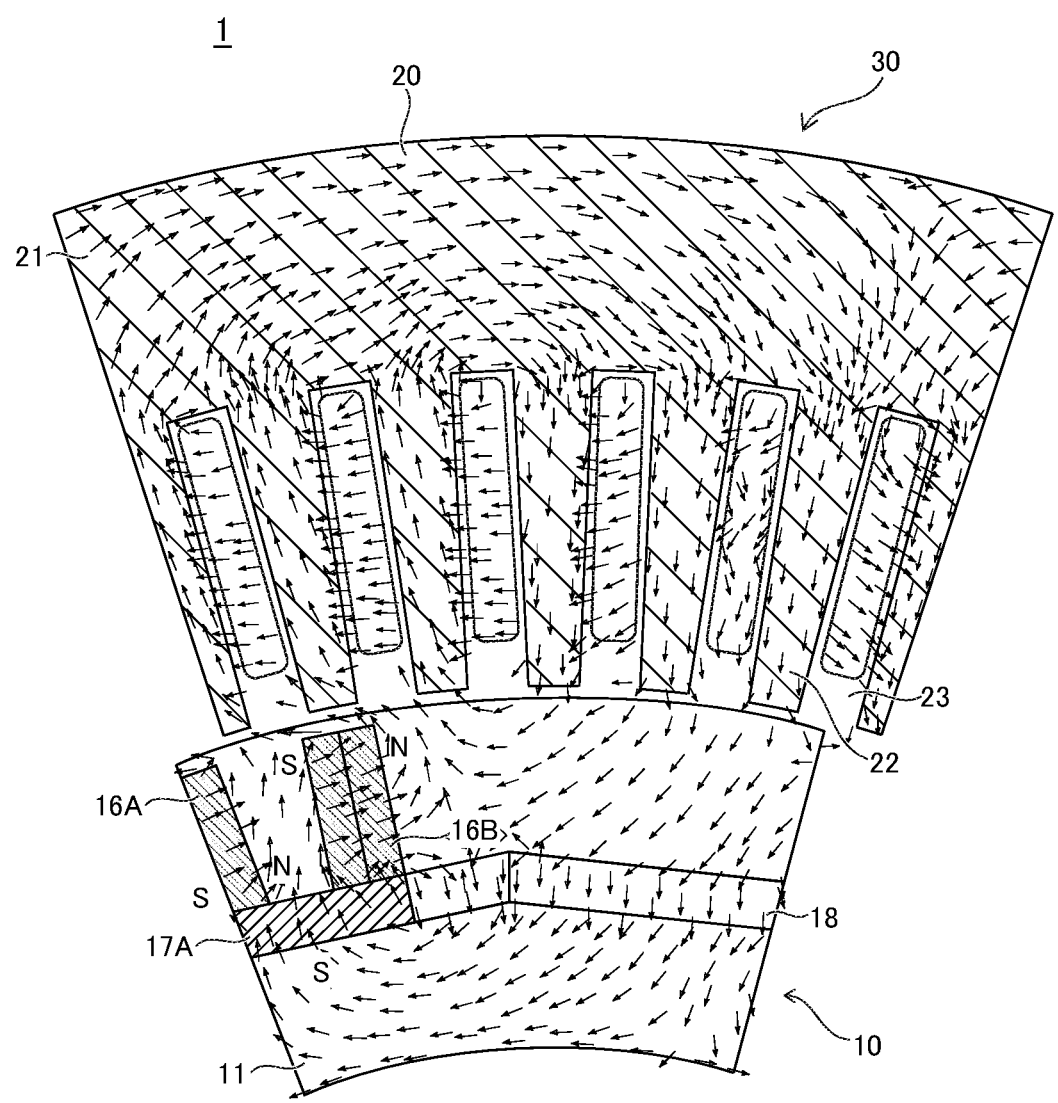
FIG. 8 is a schematic view showing a vector of a magnetic flux generated when a coil is energized between the rotor and the stator in Example 1-3.

Physical property values were applied to the models in Examples 1-1 to 1-3 and Comparative Examples 1-1 to 1-4 to analyze the surface force (component in the rotating direction) in one magnetic pole of the rotor. FIG. 7 and FIG. 8 are schematic views each showing a vector of a magnetic flux generated when a coil is energized between the rotor and the stator in Example 1-1 and Example 1-3. It should be noted that the aforementioned FIG. 5 is a schematic view showing a vector of a magnetic flux generated when a coil is energized between the rotor and the stator in Example 1-2.

Figure 9:
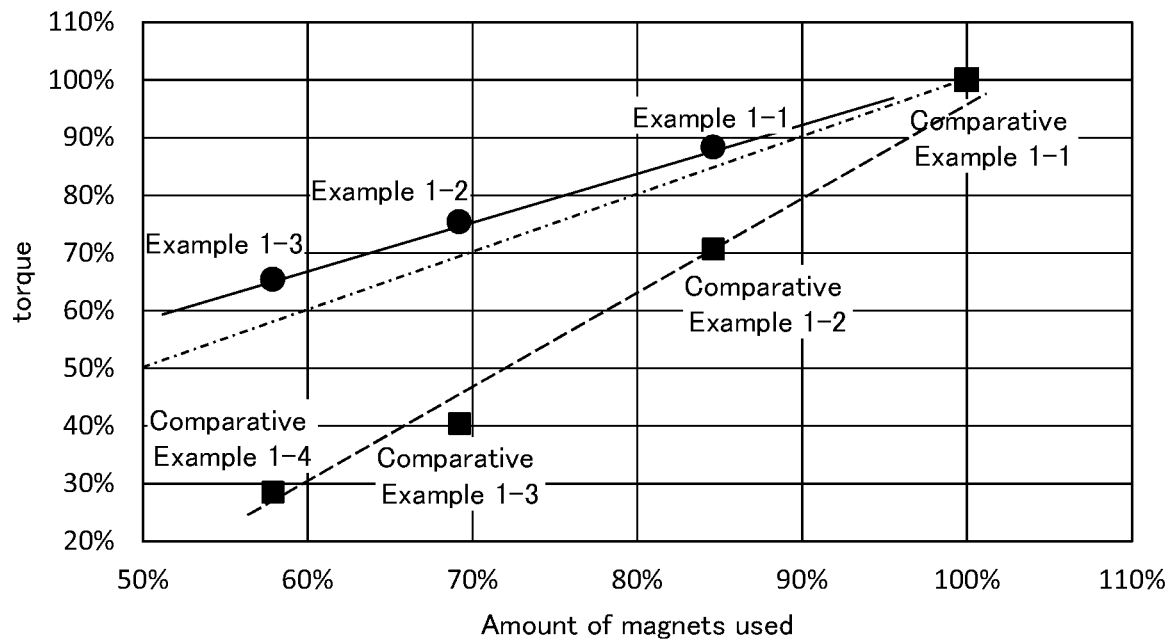
FIG. 9 is a graph showing a torque with respect to a use efficiency of permanent magnets of a rotor in Examples 1-1 to 1-3 and Comparative Examples 1-1 to 1-4.
Figure 10:
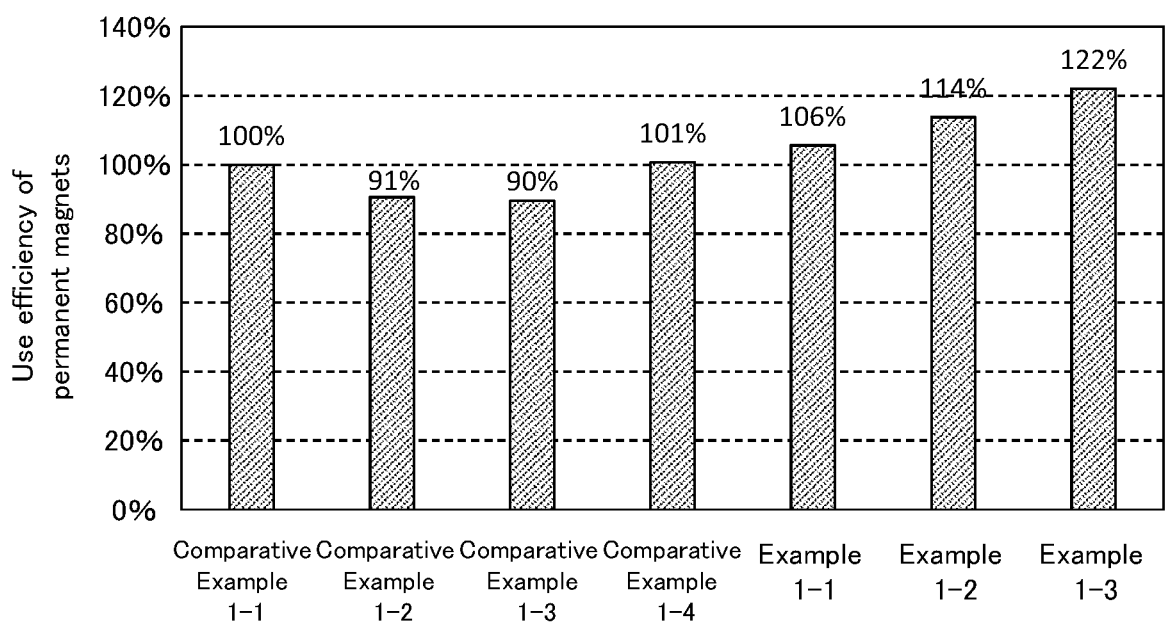
FIG. 10 is a graph showing a use efficiency of permanent magnets in Examples 1-1 to 1-3 and Comparative Examples 1-1 to 1-4.

Furthermore, based on the obtained surface force of the rotor, the torque of the rotating electrical machine was calculated. FIG. 9 is a graph showing a torque with respect to a use efficiency of permanent magnets of a rotor in Examples 1-1 to 1-3 and Comparative Examples 1-1 to 1-4. Further, the amount of magnets used when maintaining the same torque was obtained in each model, and then the reciprocal of the resultant was obtained as a use efficiency of permanent magnets. FIG. 10 is a graph showing a use efficiency of permanent magnets in Examples 1-1 to 1-3 and Comparative Examples 1-1 to 1-4. It should be noted that these graphs show the results of normalization with the result of Comparative Example 1-1 set to 100%.

As illustrated in FIG. 9, the amount of magnets used in Example 1-1 was equal to that in Comparative Example 1-2, whereas the generated torque in Example 1-1 was higher than that in Comparative Example 1-2. When Example 1-2 and Comparative Example 1-3 were compared with each other, the same result was obtained. When Example 1-3 and Comparative Example 1-4 were compared with each other, the same result was obtained. Consequently, it is assumed that the generated torque was higher in the models of Examples 1-1 to 1-3 as compared to that in Comparative Examples 1-1 to 1-4 since the auxiliary magnet was arranged disproportionately on one side of the first insertion hole in the circumferential direction of the rotor, in other words, since a clearance was formed on the other side of the first insertion hole in Examples 1-1 to 1-3.

As illustrated in FIG. 10, the rotor in Examples 1-1 to 1-3 has a higher use efficiency of permanent magnets as compared to that in Comparative Examples 1-1 to 1-4 and thus, it is assumed that a higher torque can be generated when substantially the same amount of magnets is used. In addition, the rotor in Example 1-3 had the highest use efficiency of permanent magnets, and the rotor in Example 1-2 had the second highest use efficiency of permanent magnets. When the flow of the magnetic flux in Example 1-2 illustrated in FIG. 5 is compared with the flow of the magnetic flux in Example 1-1 illustrated in FIG. 7, they are approximately equal to each other irrespective of the size of the auxiliary magnet. The tendency of the flow of the magnetic flux in Example 1-3 illustrated in FIG. 8 is equal to that in the other examples, and thus even if the amount of auxiliary magnets used is limited, it is assumed that a high torque can be ensured to some extent. Consequently, it is assumed that two main magnets of the plurality of main magnets may be arranged at the opposite ends of the auxiliary magnet in the circumferential direction in the same manner as in Example 1-3.

Example 2-1 to Example 2-4

Figure 11:
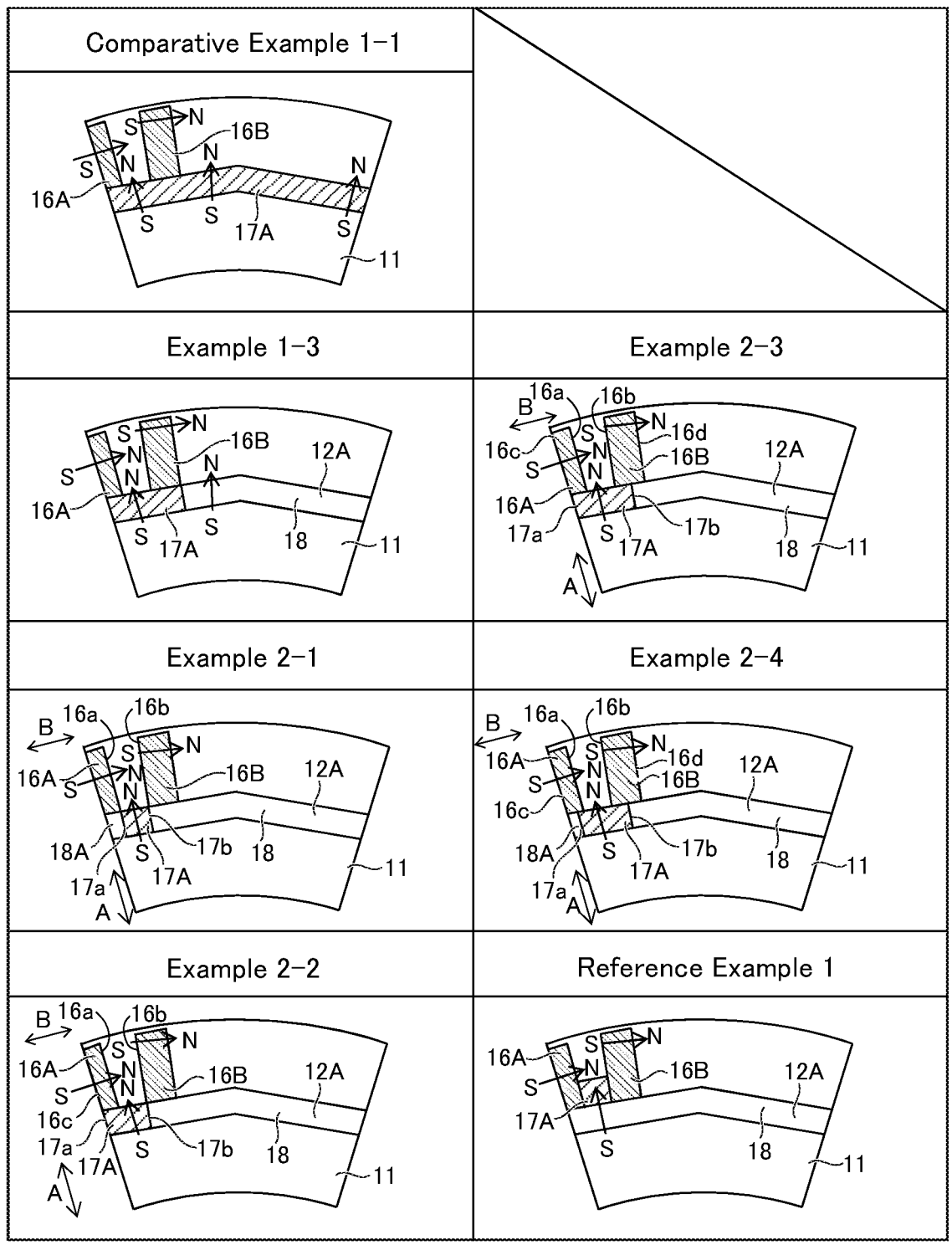
FIG. 11 is a table of views each showing an analysis model of a magnetic pole of a rotor in Comparative Example 1-1, Examples 1-3, 2-1 to 2-4, and Reference Example 1.

Models of a rotor according to Example 2-1 to Example 2-4 and Reference Example 1 were prepared in the same manner as in Example 1-2. As illustrated in FIG. 11, in each of Examples 2-1 to 2-4, two main magnets 16A and 16B are arranged at the opposite ends of the auxiliary magnet 17A in the circumferential direction, which is common to Example 1-3. Further, the first arrangement region R1 having the auxiliary magnet 17A arranged therein is included in the second arrangement region R2 having the main magnets 16A and 16B arranged therein. Therefore, the central angle θ1 of the first arrangement region R1 is smaller than or equal to the central angle θ2 of the second arrangement region R2. It should be noted that FIG. 11 also illustrates the models of the rotor in Comparative Example 1-1 and Example 1-3.

Hereinafter, distinctive features of Examples 2-1 to 2-4 and Reference Example 1 will be described. As illustrated in FIG. 11, in Example 2-1, in the first insertion hole 12A in the radial direction A of the rotor, opposite ends 17a, 17b of the auxiliary magnet 17A correspond to opposite faces 16a, 16b that respectively face two main magnets 16A and 16B. Therefore, in the case of Example 2-1, clearances 18, 18A are formed on the opposite sides of the auxiliary magnet 17A, and the clearance 18 on one side of the auxiliary magnet 17A is greater than the clearance 18A on the other side of the auxiliary magnet 17A.

In Example 2-2, in the radial direction A of the rotor, the end 17a on one side of the auxiliary magnet 17A corresponds to an outer end face 16c of the main magnet 16A on one side, and the end 17b on the other side of the auxiliary magnet 17A corresponds to the opposite face 16b of the main magnet 16B on the other side.

In Example 2-3, in the radial direction A of the rotor, the end 17a on one side of the auxiliary magnet 17A corresponds to the outer end face 16c of the main magnet 16A on one side, and the end 17b on the other side of the auxiliary magnet 17A is located in the midpoint between the opposite face 16b and an outer end face 16d of the main magnet 16B on the other side.

In Example 2-4, in the radial direction A of the rotor, the end 17a on one side of the auxiliary magnet 17A is located in the midpoint between the opposite face 16a and the outer end face 16c of the main magnet 16A on one side, and the end 17b on the other side of the auxiliary magnet 17A is located in the midpoint between the opposite face 16b and the outer end face 16d of the main magnet 16B on the other side. Therefore, in the case of Example 2-4, clearances 18, 18A are formed on the opposite sides of the auxiliary magnet 17A, and the clearance 18 on one side of the auxiliary magnet 17A is greater than the clearance 18A on the other side of the auxiliary magnet 17A.

In Reference Example 1, the auxiliary magnet 17A is arranged between the main magnets 16A and 16B.

Figure 12:
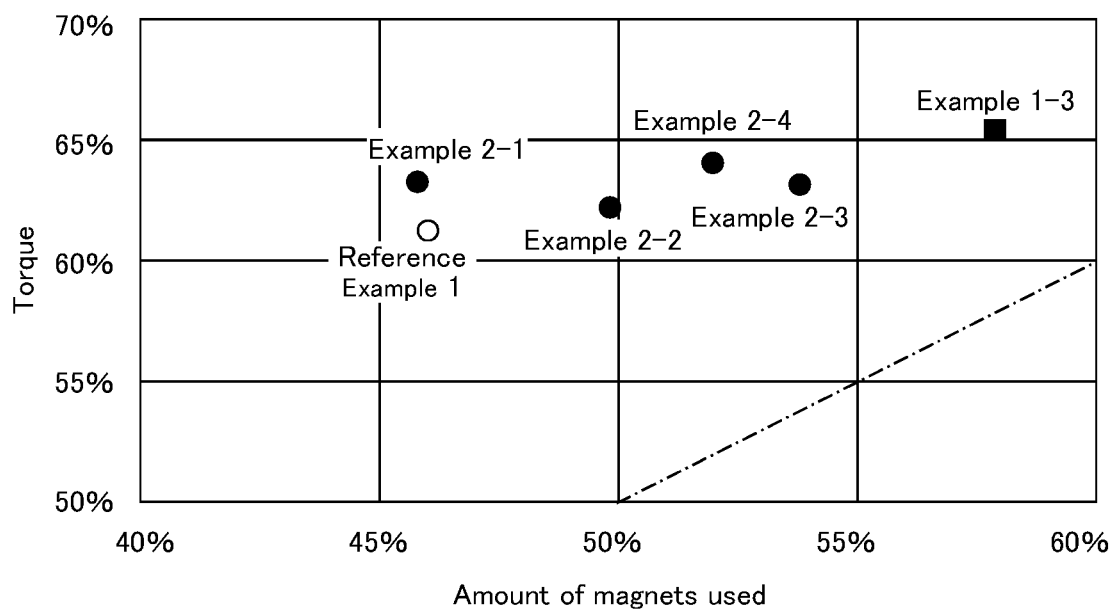
FIG. 12 is a graph showing a torque with respect to a use efficiency of permanent magnets of a rotor in Examples 1-3, 2-1 to 2-4 and Reference Example 1.
Figure 13:
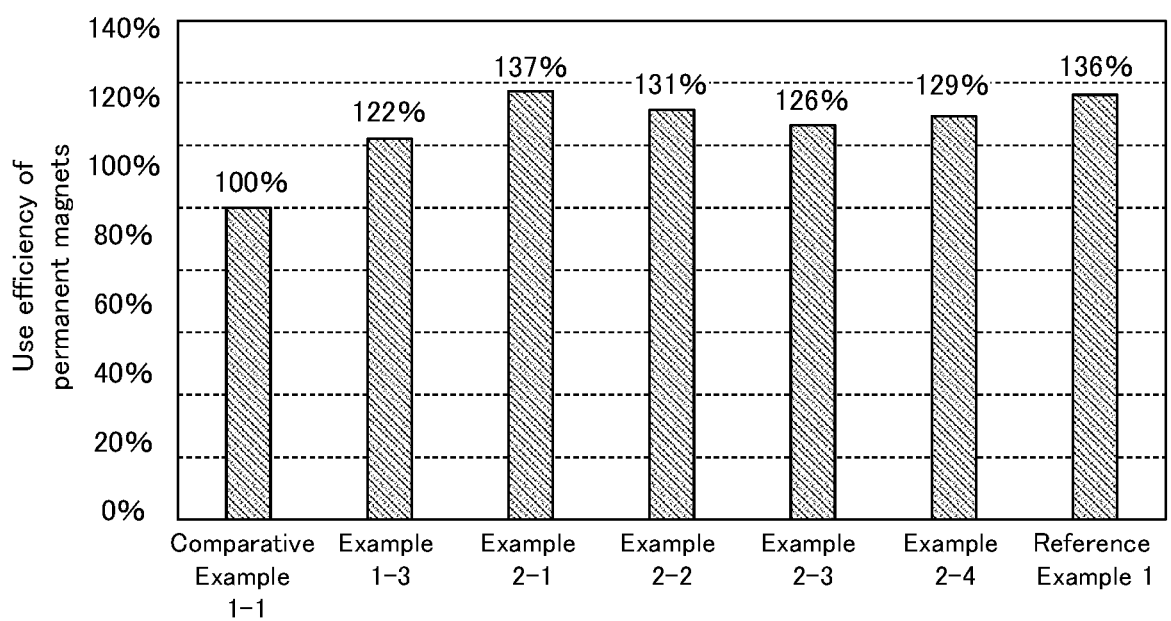
FIG. 13 is a graph showing a torque with respect to a use efficiency of permanent magnets of a rotor in Comparative Example 1-1, Examples 1-3, 2-1 to 2-4, and Reference Example 1.

Physical property values were applied to the models of the rotor in Examples 2-1 to 2-4 and Reference Example 1 to analyze the surface force (component in the rotating direction) in one magnetic pole of the rotor in the same manner as in Example 1-1. Furthermore, based on the obtained surface force of the rotor, the torque of the rotating electrical machine was calculated. FIG. 12 is a graph showing a torque with respect to a use efficiency of permanent magnets of a rotor in Examples 1-3 and 2-1 to 2-4 and Reference Example 1. Further, the amount of magnets used when maintaining the same torque was obtained in each model, and then the reciprocal of the resultant was obtained as a use efficiency of permanent magnets. FIG. 13 is a graph showing a use efficiency of permanent magnets of a rotor in Comparative Example 1-1, Examples 1-3 and 2-1 to 2-4, and Reference Example 1. It should be noted that these graphs show the results of normalization with the result of Comparative Example 1-1 set to 100%. FIG. 9 and FIG. 12 each depict a reference line by a dot-and-dash line, showing the same line, to help understand the results in comparison with the results illustrated in FIG. 9.

As illustrated in FIG. 12, in the rotor in Example 1-3, Examples 2-1 to 2-4, and Reference Example 1, it was found that the output of the torque with respect to the amount of magnets used was included in an area higher than the reference line depicted by the dot-and-dash line in the drawing. Furthermore, as illustrated in FIG. 13, it was also found that the use efficiency of permanent magnets in Examples 2-1 to 2-4 and Reference Example 1 was higher than that in Example 1-3 and exceeded 120%. Among Example 2-1 to Example 2-4, the use efficiency decreases in the order of: Example 2-1, Example 2-2, Example 2-4, Example 2-3 (high to low).

Furthermore, when Example 2-1 is compared with Example 2-2, and Example 2-3 is compared with Example 2-4, the use efficiency of permanent magnets is higher in Example 2-1 and Example 2-4, in which the clearance 18A is provided. In view of this, it is assumed that the use efficiency of permanent magnets is improved by providing the clearance 18A also on the other side of the auxiliary magnet 17A within a range greater than or equal to half the thickness of the main magnet 16A and smaller than or equal to the thickness of the main magnet 16A on one side.

The embodiment of the present disclosure has been described in detail, but the present disclosure is not limited to the above embodiment, and various design changes may be made thereto without departing the spirit of the present disclosure described in the scope of the claims.

What is claimed is:

1. A rotating electrical machine comprising:
 a rotor with permanent magnets embedded in a rotor core made of a soft magnetic material; and
 a stator positioned on an outer circumference of the rotor, wherein:
 the permanent magnets each include a main magnet arranged so as to be magnetized in a circumferential direction of the rotor, and an auxiliary magnet arranged so as to be magnetized in a radial direction of the rotor,
 the rotor core includes a plurality of first insertion holes each having the auxiliary magnet embedded therein, the auxiliary magnet being embedded so as to surround a rotation axis of the rotor in a cross-section orthogonal to the rotation axis,
 the rotor core includes a plurality of second insertion holes each having the main magnet embedded therein, the main magnet being embedded so as to extend from the auxiliary magnet toward an outer circumference of the rotor,
 the rotor includes a plurality of magnetic poles formed around the rotation axis, the magnetic poles each having the auxiliary magnet and at least one main magnet, and
 in the cross-section, the auxiliary magnet is arranged disproportionately on one side of the first insertion hole in the circumferential direction of the rotor so as to form a clearance on the other side of the first insertion hole.

2. The rotating electrical machine according to claim 1, wherein
 in each magnetic pole, the main magnets are arranged for each of the plurality of first insertion holes formed at a distance from each other in the circumferential direction of the rotor, and
 in the cross-section, the main magnets of each magnetic pole are arranged such that the main magnets are arranged asymmetrically relative to a virtual line passing the rotation axis and axisymmetrically dividing an entire fan-shaped region defining each magnetic pole.

3. The rotating electrical machine according to claim 2, wherein in each magnetic pole, the main magnet is disposed at an end on one side of the auxiliary magnet in the circumferential direction.

4. The rotating electrical machine according to claim 3, wherein in each magnetic pole, the main magnet is further disposed at an end on another side of the auxiliary magnet in the circumferential direction.

* * * * *